United States Patent
Kajita

(10) Patent No.: US 11,413,906 B2
(45) Date of Patent: Aug. 16, 2022

(54) TIRE

(71) Applicant: Sumitomo Rubber Industries, Ltd., Hyogo (JP)

(72) Inventor: Hiroaki Kajita, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 430 days.

(21) Appl. No.: 16/048,725

(22) Filed: Jul. 30, 2018

(65) Prior Publication Data
US 2019/0061435 A1  Feb. 28, 2019

(30) Foreign Application Priority Data
Aug. 23, 2017  (JP) .............................. JP2017-160501

(51) Int. Cl.
*B60C 11/00* (2006.01)
*B60C 11/13* (2006.01)
(Continued)

(52) U.S. Cl.
CPC ........ *B60C 11/1315* (2013.01); *B60C 11/005* (2013.01); *B60C 11/0041* (2013.01); *B60C 11/042* (2013.01); *B60C 11/045* (2013.01); *B60C 11/1236* (2013.01); *B60C 11/1323* (2013.01); *B60C 11/1346* (2013.01); *B60C 11/0058* (2013.01); *B60C 11/0066* (2013.01);
(Continued)

(58) Field of Classification Search
CPC ............. B60C 11/1307; B60C 11/1346; B60C 11/1315
See application file for complete search history.

(56) References Cited

U.S. PATENT DOCUMENTS 2,843,172 A * 7/1958 Berry .................... B60C 11/045
   152/209.21
3,462,328 A * 8/1969 Buckland ............ B60C 11/1346
   264/269
(Continued)

FOREIGN PATENT DOCUMENTS

EP  2946945 A1  11/2015
JP  H05-338412 A  12/1993
(Continued)

OTHER PUBLICATIONS

The extended European search report issued by the European Patent Office dated Jan. 24, 2019, which corresponds to European U.S. Appl. No. 16/048,725 and is related to U.S. Appl. No. 16/048,725.

*Primary Examiner* — Jacob T Minskey
*Assistant Examiner* — Adrien J Bernard
(74) *Attorney, Agent, or Firm* — Studebaker & Brackett PC

(57) ABSTRACT

A tire comprises a tread portion 2. The tread portion 2 includes a tread ground contacting surface (2s) and at least one main groove 3 recessed from the tread ground contacting surface (2s) and extending continuously in a tire circumferential direction. The main groove 3 has a first groove wall 11. The first groove wall is provided with a recessed portion 15 recessed outwardly in a groove width direction from a groove edge of the main groove 3 on the tread ground contacting surface. The recessed portion 15 is formed of groove wall rubber 8 having a complex elastic modulus larger than that of base rubber 7 forming a main portion of the tread ground contacting surface (2s).

19 Claims, 6 Drawing Sheets

(51) Int. Cl.
    *B60C 11/04*     (2006.01)
    *B60C 11/12*     (2006.01)

(52) U.S. Cl.
    CPC ..... *B60C 2011/133* (2013.01); *B60C 2200/06* (2013.01)

(56) References Cited

U.S. PATENT DOCUMENTS

| | | | | |
|---|---|---|---|---|
| 2007/0221304 | A1* | 9/2007 | Boiocchi | B60C 11/18 152/451 |
| 2015/0336431 | A1* | 11/2015 | Kaneko | B60C 11/11 152/209.24 |
| 2017/0217256 | A1* | 8/2017 | Hamanaka | B60C 11/13 |
| 2018/0154701 | A1* | 6/2018 | Miyake | B60C 11/01 |
| 2020/0156413 | A1* | 5/2020 | Careme | B60C 11/0075 |

FOREIGN PATENT DOCUMENTS

| | | | | |
|---|---|---|---|---|
| JP | H11-078414 A | * | 3/1999 | ......... B60C 11/0041 |
| WO | 2014102039 A1 | | 7/2014 | |
| WO | 2018172680 A1 | | 9/2018 | |

\* cited by examiner

TIRE

TECHNICAL FIELD

The present invention relates to a tire having a tread portion provided with a main groove.

BACKGROUND ART

For example, Japanese Unexamined Patent Application Publication No. H05-338412 has disclosed a tire in which a tread portion is provided with main grooves. Each of the main grooves mentioned above has groove wall surfaces extending obliquely in a direction so that a groove width thereof decreases from a groove bottom surface thereof to a tread surface thereof. The main grooves configured as such are advantageous for maintaining a drainage property after the tread portion is worn.

However, groove edge side portions of land regions divided by the main grooves tend to collapse toward a groove center of respective one of the main grooves with a connecting portion between each of the groove walls and respective one of the groove bottom surfaces as a fulcrum during running. Thereby, steering stability tends to deteriorate on a dry road surface for the tires mentioned above.

SUMMARY OF THE INVENTION

The present invention was made in view of the above problems, and a primary object thereof is to provide a tire capable of exerting excellent wet performance over a long period of time while securing the steering stability.

In one aspect of the present invention, a tire comprises a tread portion comprising a tread ground contacting surface and at least one main groove recessed from the tread ground contacting surface and extending continuously in a tire circumferential direction, wherein the main groove has a first groove wall, the first groove wall is provided with a recessed portion recessed outwardly in a groove width direction from a groove edge of the main groove on the tread ground contacting surface, and the recessed portion is formed of groove wall rubber having a complex elastic modulus larger than that of base rubber forming a main portion of the tread ground contacting surface.

In another aspect of the invention, it is preferred that a difference in a complex elastic modulus between the base rubber and the groove wall rubber is in a range of from 5.0 to 10.0 MPa.

In another aspect of the invention, it is preferred that, in a cross-sectional view of the tread portion, a boundary between the base rubber and the groove wall rubber is inclined in a direction away from a groove center of the main groove from the tread ground contacting surface toward an inner side in a tire radial direction.

In another aspect of the invention, it is preferred that the groove wall rubber includes a first portion forming the entire first groove wall, the first portion is exposed on the tread ground contacting surface, and a width in a tire axial direction of the first portion gradually decreases inwardly in a tire radial direction from the tread ground contacting surface.

In another aspect of the invention, it is preferred that the width in the tire axial direction of the first portion on the tread ground contacting surface is in a range of from 1.3 to 2.0 times a maximum recess amount of the recessed portion from the groove edge.

In another aspect of the invention, it is preferred that a tread reinforcing ply layer is provided inside the tread portion, and a height in the tire radial direction of the first portion is in a range of from 0.7 to 0.9 times a tread thickness in the tire radial direction between the tread ground contacting surface at a tire equator and an outer surface of the tread reinforcing ply layer.

In another aspect of the invention, it is preferred that the main groove includes a shoulder main groove arranged closest to a tread edge, the shoulder main groove includes the first groove wall arranged on a side of the tread edge and a second groove wall arranged on a side of the tire equator, the groove wall rubber includes a first portion forming the entire first groove wall and a second portion forming the entire second groove wall, each of the first portion and the second portion is exposed on the tread ground contacting surface, and on the tread ground contacting surface, the first portion has a width in a tire axial direction larger than that of the second portion.

In another aspect of the invention, it is preferred that the recessed portion includes a first recessed portion having a recess amount gradually decreasing from a deepest portion which is recessed most outwardly in the groove width direction toward both sides in the tire circumferential direction.

In another aspect of the invention, it is preferred that the recessed portion includes a second recessed portion having a recess amount from the groove edge constant in the tire circumferential direction.

In another aspect of the invention, it is preferred that the main groove has a second groove wall, and the second groove wall is provided with the recessed portion.

DESCRIPTION OF THE PREFERRED EMBODIMENT

An embodiment of the present invention will now be described in detail in conjunction with accompanying drawings.

Figure 1:
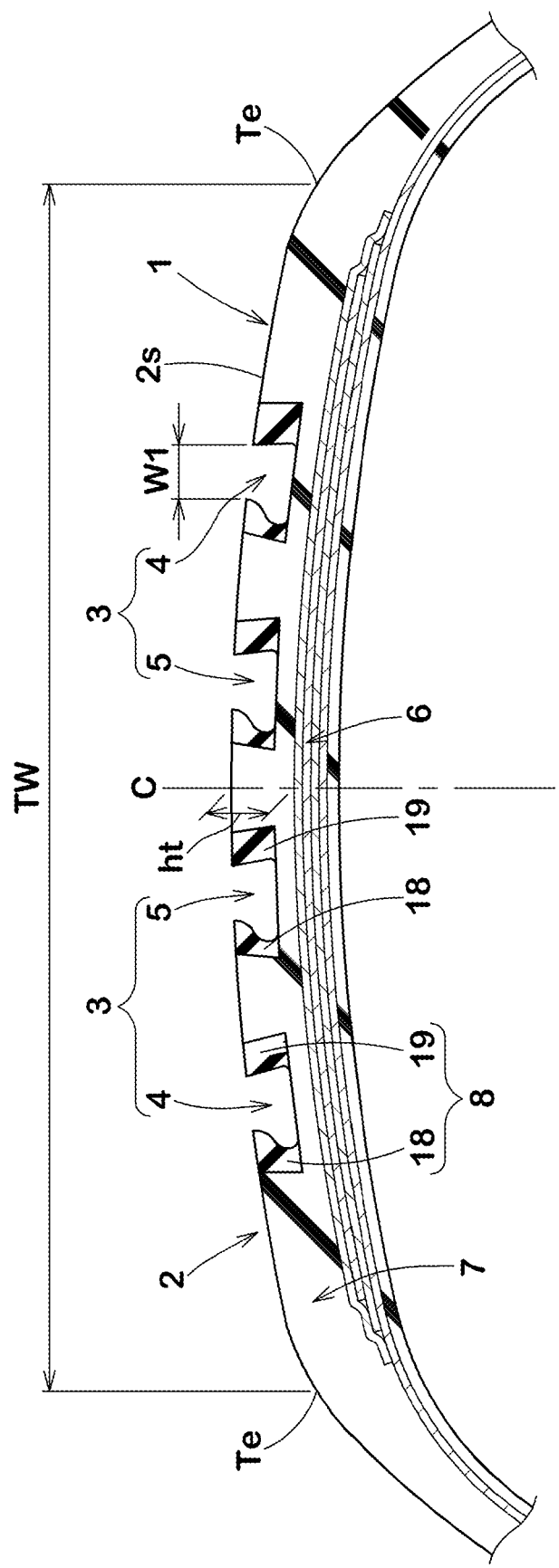
FIG. 1 is a lateral cross-sectional view of a tread portion of a tire in this embodiment.

FIG. 1 is a lateral cross-sectional view of a tread portion 2 of a tire 1 in this embodiment. Note that FIG. 1 is a meridian section passing through a tire rotational axis of the tire 1 in a standard state. The tire 1 in this embodiment is suitably used as a pneumatic tire for a passenger car, for example. However, it is not limited to such an embodiment, and the tire 1 of the present invention may be used as a tire for heavy load.

The "standard state" is a state in which the tire is mounted on a standard rim, inflated to a standard inner pressure, and loaded with no tire load. Hereinafter, dimensions and the like of various parts of the tire 1 are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tread portion 2 is provided with a tread ground contacting surface (2s) and at least one main groove 3 recessed from the tread ground contacting surface (2s) and extending continuously in a tire circumferential direction. In this embodiment, in each half in a tire axial direction of the tread portion, a shoulder main groove 4 and a crown main groove 5 adjacent to each other in a tire axial direction are respectively provided between a tire equator (C) and respective one of tread edges (Te). Each of the shoulder main grooves 4 is arranged closest to respective one of the tread edges (Te), for example. Each of the crown main grooves 5 is provided between respective one of the shoulder main grooves 4 and the tire equator (C). Thereby, the tread portion 2 in this embodiment is provided with four main grooves 3. However, the present invention is not limited to such an embodiment.

The tread edges (Te) are defined as outermost ground contacting positions in the tire axial direction when the tire 1 in the standard state is in contact with a flat surface with zero camber angles by being loaded with a standard tire load.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that a groove width w1 of each of the main grooves 3 is in the range of from 3.0% to 6.0% of a tread width TW, for example. Note that, in this specification, unless otherwise noted, the groove width of the main groove means a length between groove edges thereof on a ground contacting surface of the tread portion 2. The tread width TW is a distance in the tire axial direction in the standard state between one of the tread edges (Te) and the other one of the tread edges (Te). In the case of a pneumatic tire for a passenger car, it is preferred that a groove depth of each of the main grooves 3 is in the range of from 5 to 10 mm, for example.

Figure 2:
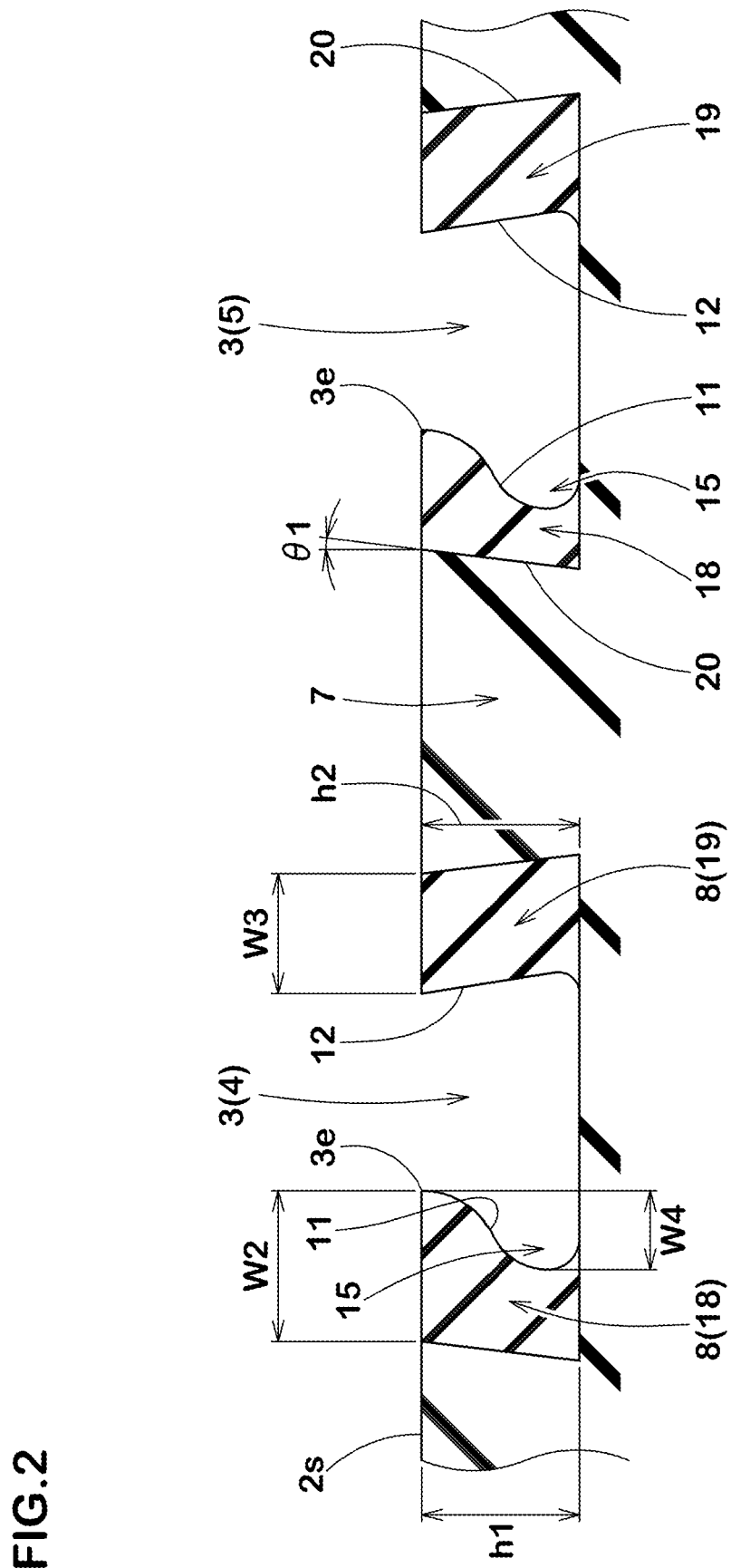
FIG. 2 is an enlarged cross-sectional view of one of shoulder main grooves and one of crown main grooves of FIG. 1.

FIG. 2 is an enlarged cross-sectional view of one of the shoulder main grooves 4 and its adjacent one of the crown main grooves 5 as a drawing for explaining the configuration of the main grooves 3. As shown in FIG. 2, each of the main grooves 3 has a first groove wall 11 and a second groove wall 12. In this embodiment, the first groove wall 11 is the groove wall on a side of respective one of the tread edges (Te) (left side in FIG. 2). The second groove wall 12 is the groove wall on a side of the tire equator (C) (right side in FIG. 2).

Each of the first groove walls 11 is provided with a recessed portion 15 recessed outwardly in a groove width direction from a groove edge (3e) of respective one of the main grooves 3 on the tread ground contacting surface (2s). Even when the tread portion 2 is worn, the recessed portions 15 ensure opening area of the main grooves 3 in the tread ground contacting surface (2s), therefore, excellent wet performance is exerted over a long period of time.

The recessed portion 15 is formed of groove wall rubber 8 having a complex elastic modulus larger than that of base rubber 7 forming the main portion of the tread ground contacting surface (2s). Thereby, rigidity of the recessed portions 15 is increased, therefore, it is possible that groove edge side portions of land regions divided by the main grooves 3 are suppressed from collapsing toward a groove center of corresponding one of the main grooves 3. Thereby, deterioration of the steering stability is suppressed.

In the present specification, the complex elastic modulus is a value measured in accordance with Japanese Industrial Standard JIS-K6394 by using a viscoelasticity spectrometer available from Iwamoto Quartz GlassLab Co., Ltd. under the following conditions.

Initial strain: 10%
Amplitude: ±2%
Frequency: 10 Hz
Deformation mode: Tension
Measurement temperature: 30 degrees Celsius It is preferred that a complex elastic modulus E*1 of the base rubber 7 is in the range of from 4.0 to 8.0 MPa, for example. It is preferred that a complex elastic modulus E*2 of the groove wall rubber 8 is in the range of from 9.0 to 13.0 MPa, for example. In a more preferred embodiment, a difference between the complex elastic modulus E*2 of the groove wall rubber 8 and the complex elastic modulus E*1 of the base rubber 7 is in the range of from 5.0 to 10.0 MPa, for example.

The groove wall rubber 8 in this embodiment includes a first portion 18 forming the entire first groove wall 11 and a second portion 19 forming the entire second groove wall 12, for example. In a preferred embodiment, a groove bottom surface of each of the main grooves 3 is formed of not the groove wall rubber 8 but the base rubber 7. Thereby, the groove bottom surface is easily deformed appropriately, therefore, it is possible that occurrence of cracks in the groove bottom surface is suppressed.

It is preferred that each of the first portion 18 and the second portion 19 is exposed on the tread ground contacting surface (2s). Thereby, deformation of the land regions is further suppressed.

When the tread portion 2 is worn, the depths of the main grooves are decreased, therefore, the tread portion 2 becomes difficult to be deformed, thereby, even if reinforcing effect by the first portion 18 and the second portion 19 is small, appropriate steering stability is obtained. Therefore, it is preferred that widths in the tire axial direction of the first portion 18 and the second portion 19 of the tread portion 2 each gradually decrease inwardly in a tire radial direction from the tread ground contacting surface (2s). Thereby, ground contacting area of the base rubber 7 when the tread portion 2 is worn is secured, therefore, appropriate steering stability and grip force are exerted over a long period of time.

A width w2 of each of the first portions 18 in the tire axial direction on the tread ground contacting surface (2s) and a width w3 of each of the second portions 19 in the tire axial direction on the tread ground contacting surface (2s) are preferably not less than 1.3 times, more preferably not less than 1.5 times, and preferably not more than 2.0 times, more preferably not more than 1.8 times a maximum recess amount w4 of each of the recessed portion 15 from the groove edge thereof. The groove wall rubber 8 configured as such can improve the steering stability and ride comfort in a good balance.

In each of the crown main grooves 5, it is preferred that the width w2 of the first portion 18 and the width w3 of the second portion 19 are each in the range of from 0.2 to 0.3 times a width of the land region in which these are provided.

In the land regions on the outer side in the tire axial direction of the shoulder main grooves 4, as compared with other land regions, variation amount of ground contact pressure applied thereto is large, therefore, they tend to easily wear. Thereby, in each of the shoulder main grooves 4, it is preferred that the first portion 18 has the width in the tire axial direction larger than that of the second portion 19.

Each of a height (h1) in the tire radial direction of each of the first portions 18 and a height (h2) in the tire radial direction of each of the second portions 19 is preferably not less than 0.6 times, more preferably not less than 0.7 times, and preferably not more than 1.0 times, more preferably not more than 0.9 times a tread thickness (ht) (shown in FIG. 1), for example. The groove wall rubber 8 configured as such can exert the above-mentioned effects over a long period of time. Note that the tread thickness (ht) is a distance in the tire radial direction between the tread ground contacting surface (2s) at the tire equator (C) and an outer surface of a tread reinforcing ply layer 6 provided inside the tread portion 2.

In the cross-sectional view of the tread portion 2, each of boundaries 20 between the base rubber 7 and the groove wall rubber 8 is inclined in a direction away from the groove center of respective one of the main grooves 3 from the tread ground contacting surface (2s) toward the inner side in the tire radial direction. Further, it is preferred that each of the boundaries 20 is inclined at an angle θ1 in the range of from 5 to 15 degrees with respect to a respective tread normal line, for example. Thereby, a sufficient distance is secured between each of the boundaries 20 and its adjacent one of the groove walls, therefore, the groove walls are reinforced more effectively.

Figure 3:
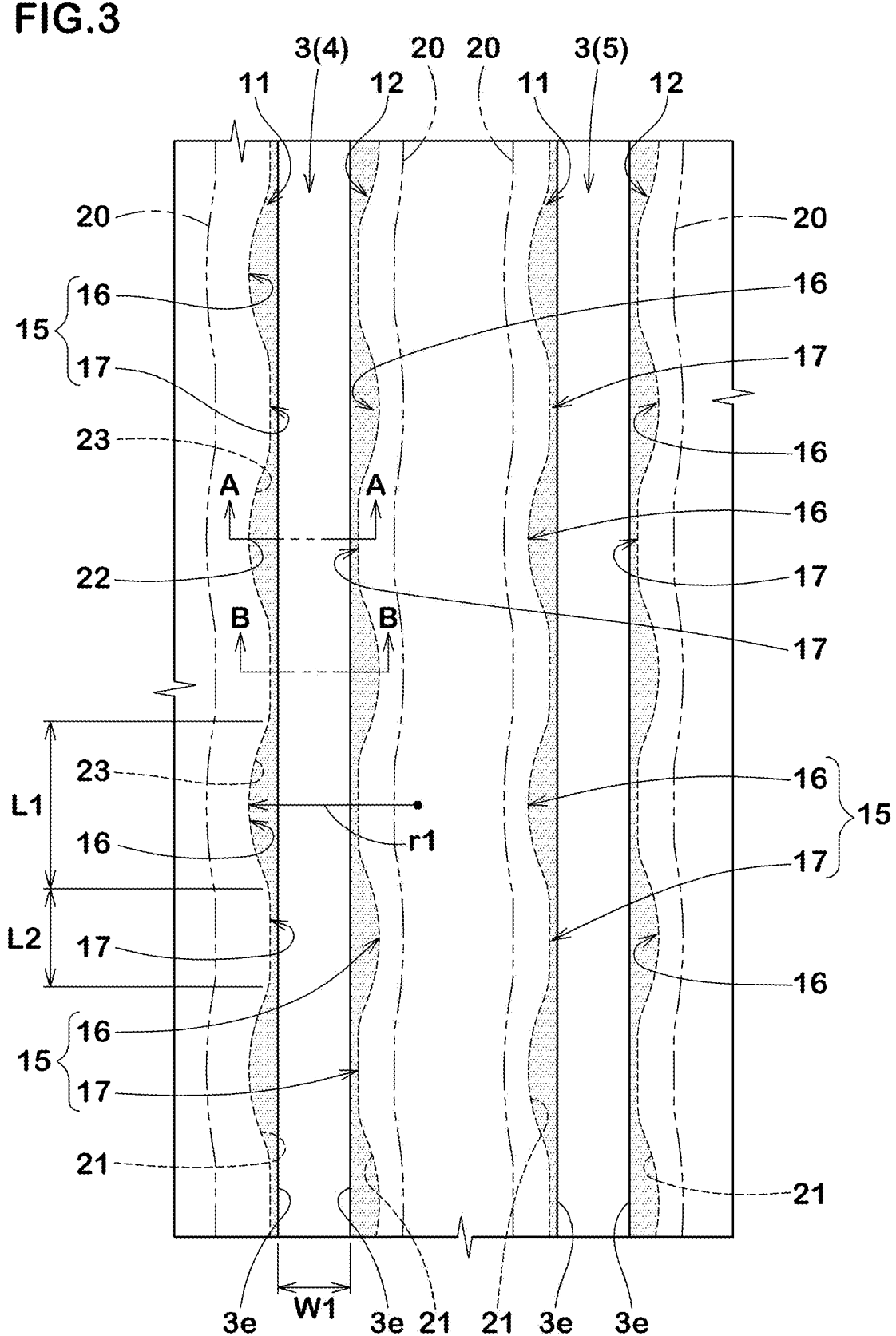
FIG. 3 is an enlarged plan view of the shoulder main groove and the crown main groove of FIG. 2

FIG. 3 is an enlarged plan view of one of the shoulder main grooves 4 and one of the crown main grooves 5 as a drawing showing an embodiment of the recessed portions 15. In FIG. 3, each of the groove edges (3e) of the main grooves 3 is indicated by a solid line and each of contours 21 of the groove walls thereof in a plan view of the tread portion 2 is indicated by a broken line so that the configuration of the recessed portions 15 can be easily understood. Further, regions between each of the groove edges (3e) of the main grooves 3 and the contour 21 of one of the groove walls respectively adjacent thereto is shaded with hatching. The boundaries 20 between the base rubber 7 and the groove wall rubber 8 are indicated by two-dot chain lines. As shown in FIG. 3, the recessed portions 15 in this embodiment are provided in the first groove walls 11 and the second groove walls 12. Each of the recessed portions 15 includes a first recessed portion 16 and a second recessed portion 17, for example.

It is preferred that each of the first recessed portions 16 has the recess amount from the respective groove edge (3e) gradually decreasing from a deepest portion 22 recessed most outwardly in the groove width direction toward both sides in the tire circumferential direction, for example. Thereby, the rigidity of the land regions divided by the main grooves 3 is ensured on both sides in the tire circumferential direction of each of the deepest portions 22, therefore, it is possible that, on both sides in the tire circumferential direction of each of the deepest portions 22, each of the groove edge side portions of the land regions divided by the main grooves 3 is suppressed from collapsing toward the groove center of corresponding one of the main grooves 3. Further, the first recessed portions 16 smoothly changes the rigidity of the land regions in the tire circumferential direction, therefore, local deformation of the groove edge side portions is suppressed. Thereby, excellent steering stability can be obtained.

In general, main grooves continuously extending in the tire circumferential direction discharge water to the rear side in the tire running direction during running on a wet road surface, but when the amount of water on the road surface is large, they tend to push a part of the water to the front side in the tire running direction. In the main groove 3 in this embodiment, the first recessed portions 16 mentioned above can push a part of the water to the front side in the tire running direction and to the outer side in the tire axial direction, therefore, the displaced water is consequently suppressed from getting into the gap between the tread portion 2 and the road surface. Thereby, the above-described first recessed portions 16 can effectively suppress the hydroplaning phenomenon as compared with the recessed portions having a constant recess amount in the tire circumferential direction.

Each of the first recessed portions 16 has a contour portion 23 smoothly curved and recessed in a cross section passing through the respective deepest portion 22 and taken in parallel with the ground contacting surface of the tread portion 2, for example. The first recessed portions 16 configured as such make it easier to take out ribs for forming the main grooves of a vulcanization mold at the time of vulcanization molding (hereinafter, such effect may be referred to as "improved mold releasability").

It is preferred that, in each of the first recessed portions 16, the curvature of the arcuate contour portion in a cross section taken in parallel with the ground contacting surface of the tread portion 2 gradually increases toward the inner side in the tire radial direction. The first recessed portions 16 configured as such can secure large groove volume of the main grooves 3 while suppressing deformation of the groove edge side portions.

In order to further improve the mold releasability, it is preferred that a radius of curvature (r1) of each of the contour portions 23 is in the range of from 1.5 to 3.0 times the groove width w1 of each of the main grooves 3, for example. It is preferred that a length L1 in the tire circumferential direction of each of the first recessed portions 16 is in the range of from 2.0 to 3.0 times the groove width w1 of each of the main grooves 3, for example. The first recessed portions 16 configured as such can provide excellent wet performance even when the tread portion 2 is worn while ensuring the steering stability as when the tire is newly used.

Figure 4A:
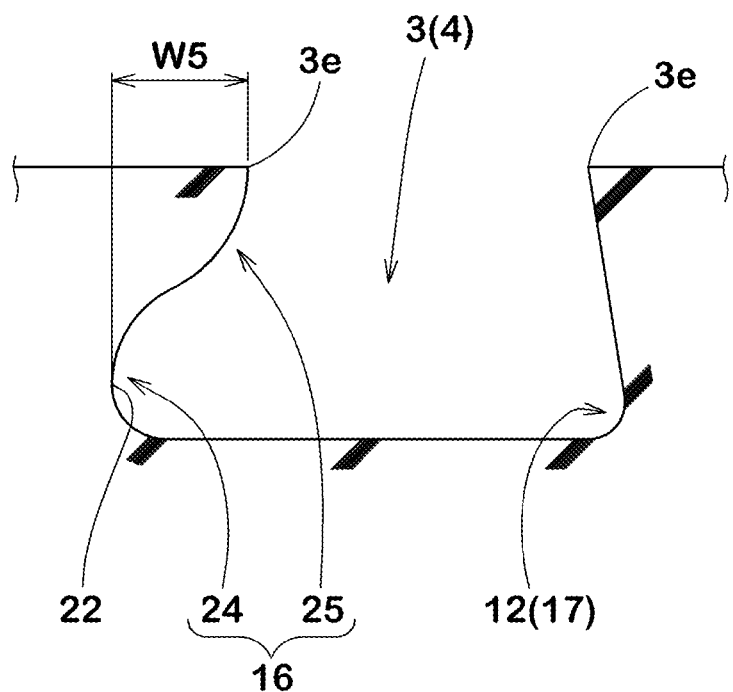
FIG. 4A is a cross-sectional view taken along A-A line of FIG. 3.

FIG. 4A is a cross-sectional view taken along A-A line of FIG. 3 and corresponds to a lateral cross-sectional view of one of the first recessed portions 16 provided in one of the first groove walls 11 taken so as to pass through the deepest portion 22 thereof. As shown in FIG. 4A, it is preferred that each of the first recessed portions 16 is provided on a side of the groove bottom of the respective groove wall of the main grooves 3.

Each of the first recessed portions 16 in this embodiment includes a concave surface portion 24 recessed outwardly in the groove width direction, and a convex surface portion 25 connected with the concave surface portion 24 on the outer side thereof in the tire radial direction and convex toward the side of the groove center line of respective one of the main grooves 3, for example. It is preferred that each of the concave surface portion 24 and the convex surface portion 25 is curved in a smooth arc shape. However, each of the first recessed portions 16 is not limited to such an embodiment, and may have a flat surface formed between the deepest portion 22 and the groove edge (3e), for example.

It is preferred that, in each of the first recessed portions 16 in the lateral cross-sectional view passing through the respective deepest portion 22, the recess amount gradually decreases radially outwardly from the respective deepest portion 22. A maximum recess amount w5 of each of the first recessed portions 16 is preferably not less than 0.20 times, more preferably not less than 0.40 times, and preferably not more than 0.80 times. more preferably not more than 0.60 times the groove width w1 (shown in FIG. 3), which is the length between the groove edges of each of the main grooves 3. The first recessed portions 16 configured as such can exert excellent mold releasability and the wet performance. Note that, the maximum recess amount w5 of each of the first recessed portions 16 in this embodiment corresponds to the maximum recess amount w4 of each of the recessed portions 15 described above.

As shown in FIG. 3, each of the second recessed portions 17 in this embodiment has the recess amount constant in the tire circumferential direction from the respective groove edge (3e). The second recessed portions 17 configured as such together with the first recessed portions 16 can improve the mold releasability and the wet performance.

It is preferred that each of the second recessed portions 17 has a length in the tire circumferential direction smaller than that of each of the first recessed portions 16, for example. It is preferred that a length L2 in the tire circumferential direction of each of the second recessed portions 17 is in the range of from 0.45 to 0.60 times the length L1 in the tire circumferential direction of each of the first recessed portions 16, for example. The second recessed portions 17 configured as such can improve the steering stability and the wet performance in a good balance.

Figure 4B:
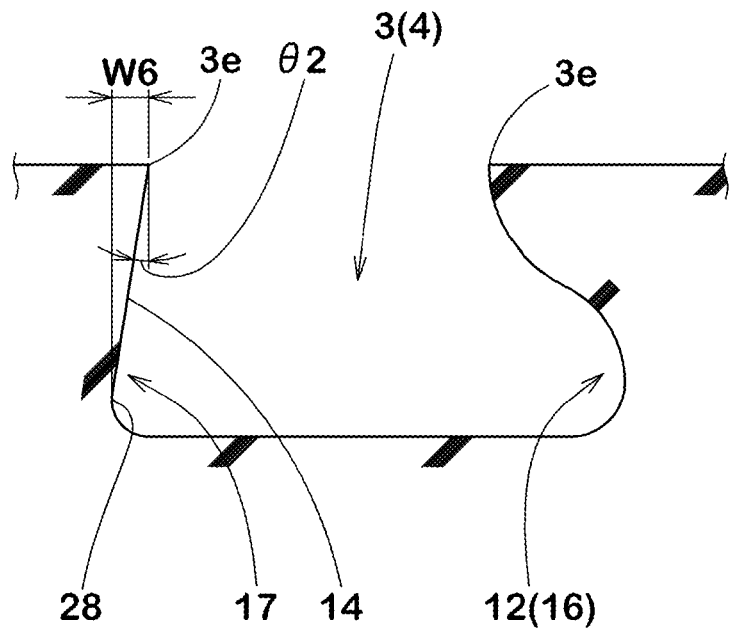
FIG. 4B is a cross-sectional view taken along B-B line of FIG. 3.

FIG. 4B is a cross-sectional view taken along B-B line of FIG. 3 and corresponds to a lateral cross-sectional view passing through one of the second recessed portions 17 provided in one of the first groove walls 11. As shown in FIG. 3B, each of the second recessed portions 17 has a flat surface 14 arranged between a deepest portion 28 and respective one of the groove edges (3e), for example. The second recessed portions 17 configured as such are helpful for improving the mold releasability.

It is preferred that an angle θ2 of the flat surface 14 of each of the second recessed portions 17 is in the range of from 5 to 15 degrees, for example. Note that the angle θ2 is an angle between each of the flat surfaces 14 and the tread normal line passing through respective one of the groove edges (3e). The second recessed portions 17 configured as such can improve the mold releasability and the wet performance after the tread portion is worn in a good balance.

From the similar point of view, it is preferred that a maximum recess amount w6 of each of the second recessed portions 17 is smaller than the maximum recess amount w5 of each of the first recessed portions 16. Specifically, it is preferred that the maximum recess amount w6 of each of the second recessed portions 17 is in the range of from 0.05 to 0.15 times the groove width w1 of each of the main grooves 3.

As shown in FIG. 3, it is preferred that each of the first groove walls 11 in this embodiment is provided with the first recessed portions 16 and the second recessed portions 17 described above arranged alternately in the tire circumferential direction. Thereby, uneven wear of the groove edges of the main grooves 3 is suppressed.

As with the first groove walls 11, each of the second groove walls 12 is provided with the recessed portions 15 described above. In a preferred embodiment, each of the second groove walls 12 is provided with a plurality of the first recessed portions 16 and a plurality of the second recessed portions 17. As a further preferred embodiment, each of the second groove walls 12 in this embodiment is provided with the first recessed portions 16 and the second recessed portions 17 arranged alternately in the tire circumferential direction. Thereby, the steering stability as when the tire is newly used and the wet performance after the tread portion is worn are improved in a good balance. Note that FIG. 4A is a lateral cross-sectional view of one of the second recessed portions 17 provided in one of the second groove walls 12 and FIG. 4B is a lateral cross-sectional view of one of the first recessed portions 16 provided in one of the second groove walls 12.

As shown in FIG. 3, in this embodiment, each of the first recessed portions 16 provided in one of the second groove walls 12 faces respective one of the second recessed portions 17 provided in one of the first groove walls 11 adjacent thereto, for example. Each of the second recessed portions 17 provided in one of the second groove walls 12 faces respective one of the first recessed portions 16 provided in one of the first groove walls 11 adjacent thereto, for example. Thereby, the first recessed portions 16 provided in one of the first groove walls 11 and the first recessed portions 16 provided in one of the second groove walls 12 adjacent thereto are arranged alternately in the tire circumferential direction, for example. The shoulder main grooves 4 configured as such can exert excellent mold releasability.

In each of the shoulder main grooves 4 and each of the crown main grooves 5, the first recessed portions 16 provided in the first groove wall 11 and the first recessed portions 16 provided in the second groove wall 12 are arranged alternately in the same phase with each other in the tire circumferential direction. In other words, each of the first recessed portions 16 of the first groove wall 11 of one of the shoulder main grooves 4 is adjacent in the tire axial direction to respective one of the first recessed portions 16 provided in the groove wall on the same side (the groove wall on the left side in FIG. 3) of one of the crown main grooves 5 adjacent thereto. Similarly, each of the first recessed portion 16 provided in the second groove wall 12 of one of the shoulder main grooves 4 is adjacent in the tire axial direction to respective one of the first recessed portion 16 provided in the groove wall on the same side (the groove wall on the right side in FIG. 3) of one of the crown main grooves 5 adjacent thereto. Thereby, lateral rigidity of the land region defined between one of the shoulder main grooves 4 and one of the crown main grooves 5 adjacent thereto is secured, therefore, excellent steering stability is exerted.

Figure 5:
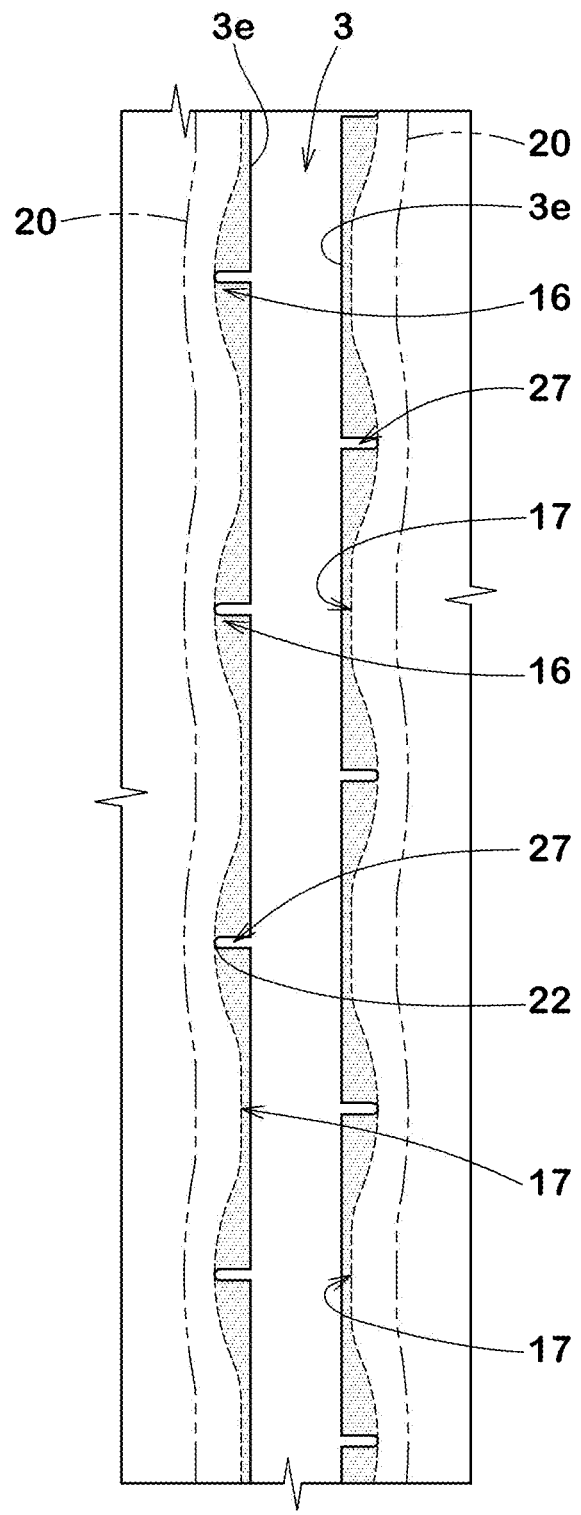
FIG. 5 is an enlarged plan view of one of the main grooves according to another embodiment of the present invention.

FIG. 5 is an enlarged view of one of the main grooves 3 according to another embodiment of the present invention. In FIG. 5, the same reference numerals are given to the elements common to the embodiment described above, and the explanation thereof is omitted here.

As shown in FIG. 5, in this embodiment, sipes 27 each extending outwardly in the groove width direction from the main groove 3 are provided. Each of the sipes 27 is connected with the respective one of the first recessed portions 16 described above. Each of the first recessed portions 16 in this embodiment is provided with one sipe 27.

Each of the first recessed portions 16 may be provided with a plurality of the sipes 27, for example. In a more preferred embodiment, each of the sipes 27 is connected with the deepest portion 22 of respective one of the first recessed portions 16. The sipes 27 configured as such open moderately when the rib for forming the main groove of the vulcanization mold is taken out from the tread portion 2, therefore, it is possible that the rib is easily taken out. Thereby, the recess amount of each of the first recessed portions 16 can be further increased, therefore, it is possible that the wet performance is further improved. Note that, in this specification, the term "sipe" means a cut or a groove having a width less than 1.5 mm.

It is preferred that each of the sipes 27 has the same length in the tire axial direction as the recess amount of the deepest portion 22 of the first recessed portion 16, for example. The sipes 27 configured as such can improve the steering stability and the wet performance in a good balance. Further, in another embodiment, each of the sipes 27 may have the length in the tire axial direction larger than the recessed amount of the deepest portion 22. The sipes 27 configured as such can further improve the mold releasability and the wet performance.

While detailed description has been made of embodiments of the present invention, the present invention can be embodied in various forms without being limited to the illustrated embodiments.

WORKING EXAMPLE (EXAMPLE)

Figure 6A:
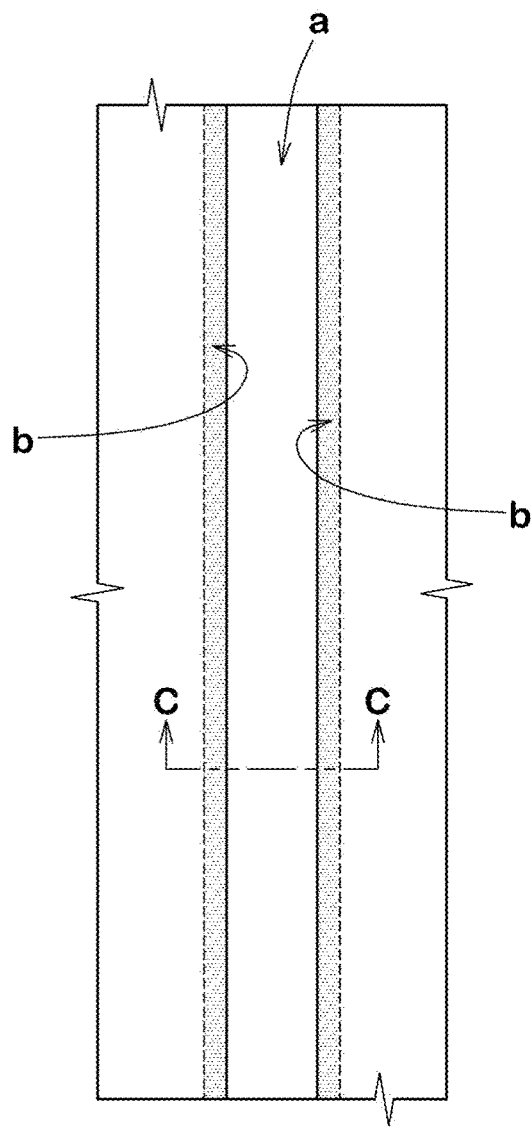
FIG. 6A is an enlarged plan view of one of the main grooves of Reference 1.
Figure 6B:
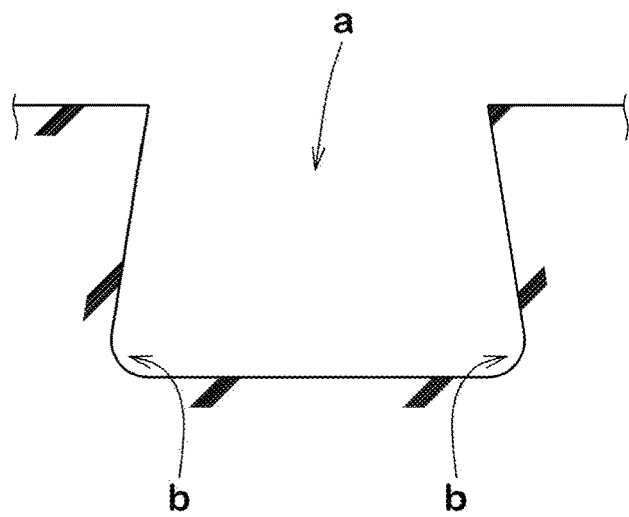
FIG. 6B is a cross-sectional view taken along C-C line of FIG. 6A.

Tires of size 245/45R19 having the main grooves described above were made by way of test according to the specifications listed in Table 1. As References 1 and 2, tires having the groove wall rubber having the same complex elastic modulus as that of the base rubber were made by way of test. As shown in FIGS. 6A and 6B, each of main grooves (a) of the tire as the Reference 1 is provided on the groove walls on both sides respectively thereof with recessed portions (b) each having the constant recess mount in the tire circumferential direction. Note that the groove volume of each of the main grooves (a) of the Reference 1 is the same as the groove volume of each of the main grooves of Example 1. The tire as the Reference 2 has the main grooves each having the shape shown in FIG. 3. Each of the test tires was tested for the steering stability, the ride comfort, and the wet performance after the tire is worn. Common specifications of the test tires and the test methods are as follows.

<Steering Stability and Ride Comfort>

The test tires were mounted on four wheels of a rear wheel drive passenger car with a displacement of 4600 cc under the following conditions, then while a driver drove the test car on a dry road surface, the steering stability and the ride comfort were evaluated by the driver's feeling. The results are indicated by an evaluation point based on the Reference 1 being 100, wherein the larger the numerical value, the better the steering stability or the ride comfort is.

Tire rim: 19×8.0 J
Tire inner pressure: 230 kPa

<Wet Performance after Wear>

By using an inside drum testing machine, while the test tires were run on the drum surface covered by 5.0 mm depth of water under the following conditions, the speed when the hydroplaning phenomenon occurred was measured. The results are indicated by an index based on the Reference 1 being 100, wherein the larger the numerical value, the higher the measured speed, which shows better wet performance.

Test tire: tread portion was worn so that depth of main groove is 50% of that of new tire
Slip angle: 1.0 degree
Vertical load: 4.2 kN The test results are shown in Table 1.

TABLE 1

|  | Ref. 1 | Ref. 2 | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| Figure showing shapes of main grooves | FIG. 6 | FIG. 3 | FIG. 3 | FIG. 3 | FIG. 3 | FIG. 3 | FIG. 3 | FIG. 3 | FIG. 3 |
| Complex elastic modulus of Base rubber [mPa] | 6.0 | 6.0 | 6.0 | 6.0 | 6.0 | 6.0 | 6.0 | 6.0 | 6.0 |
| Complex elastic modulus of Groove wall rubber [mPa] | 6.0 | 6.0 | 11.0 | 9.0 | 13.0 | 11.0 | 11.0 | 11.0 | 11.0 |
| Width W2 of First portion of Groove wall rubber of Shoulder main groove/Maximum recess amount W4 of Recessed portion | — | — | 1.80 | 1.80 | 1.80 | 1.30 | 1.50 | 1.90 | 2.00 |
| Height (h1) of First portion of Groove wall rubber of Shoulder main groove/Tread thickness (ht) | — | — | 0.80 | 0.80 | 0.80 | 0.80 | 0.80 | 0.80 | 0.80 |
| Maximum recess amount W5 of First recessed portion of Shoulder main groove/Groove width W1 | — | 0.50 | 0.50 | 0.50 | 0.50 | 0.50 | 0.50 | 0.50 | 0.50 |
| steering stability [evaluation point] | 100 | 103 | 109 | 106 | 110 | 107 | 108 | 109 | 109 |
| Ride comfort [evaluation point] | 100 | 100 | 100 | 100 | 98 | 100 | 100 | 99 | 99 |
| Wet performance after wear [index] | 100 | 103 | 103 | 103 | 103 | 103 | 103 | 102 | 102 |

|  | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- |
| Figure showing shapes of main grooves | FIG. 3 | FIG. 3 | FIG. 3 | FIG. 3 | FIG. 3 | FIG. 3 | FIG. 3 | FIG. 3 |
| Complex elastic modulus of Base rubber [mPa] | 6.0 | 6.0 | 6.0 | 6.0 | 6.0 | 6.0 | 6.0 | 6.0 |
| Complex elastic modulus of Groove wall rubber [mPa] | 11.0 | 11.0 | 11.0 | 11.0 | 11.0 | 11.0 | 11.0 | 11.0 |
| Width W2 of First portion of Groove wall rubber of Shoulder main groove/Maximum recess amount W4 of Recessed portion | 1.80 | 1.80 | 1.80 | 1.80 | 1.80 | 1.80 | 1.80 | 1.80 |
| Height (h1) of First portion of Groove wall rubber of Shoulder main groove/Tread thickness (ht) | 0.60 | 0.70 | 0.90 | 1.00 | 0.80 | 0.80 | 0.80 | 0.80 |

TABLE 1-continued

| | | | | | | | | |
|---|---|---|---|---|---|---|---|---|
| Maximum recess amount W5 of First recessed portion of Shoulder main groove/Groove width w1 | 0.50 | 0.50 | 0.50 | 0.50 | 0.20 | 0.40 | 0.60 | 0.80 |
| Steering stability [evaluation point] | 107 | 109 | 109 | 109 | 110 | 109 | 108 | 106 |
| Ride comfort [evaluation point] | 100 | 100 | 100 | 99 | 99 | 100 | 100 | 101 |
| Wet performance after wear [index] | 103 | 103 | 103 | 102 | 100 | 103 | 103 | 104 |

From the test results, it was confirmed that the tires as Examples exerted excellent wet performance even when they were worn while ensuring the steering stability.

The invention claimed is:

1. A tire comprising a tread portion comprising a tread ground contacting surface and at least one main groove recessed from the tread ground contacting surface and extending continuously in a tire circumferential direction, wherein
the main groove has a first groove wall,
the first groove wall is provided with recessed portions arranged continuously in the tire circumferential direction and each recessed outwardly in a groove width direction from a groove edge of the main groove on the tread ground contacting surface so that the entire first groove wall is recessed from the groove edge at any depth level of the main groove,
each of the recessed portions is formed of groove wall rubber having a complex elastic modulus larger than that of base rubber forming a main portion of the tread ground contacting surface,
each of the recessed portions has a most recessed portion recessed most outwardly in the groove width direction from a groove centerline of the main groove,
the recessed portions include first recessed portions and second recessed portions arranged alternately one by one and continuously to each other in the tire circumferential direction at any depth level of the main groove,
each of the first recessed portions has a recess amount gradually and continuously decreasing toward both sides in the tire circumferential direction from the most recessed portion to both ends of the each of the first recessed portions in the tire circumferential direction in a cross-sectional view of the tread portion passing through the most recessed portion and parallel to the tread ground contacting surface,
in a radial cross section of each of the first recessed portions passing through the most recessed portion thereof, each of the first recessed portions has the recess amount gradually and continuously decreasing toward both sides in the tire radial direction from the most recessed portion to the groove edge and to a groove bottom of the main groove, and
each of the second recessed portions has a recess amount constant in the tire circumferential direction over an entire circumferential length of the each of the second recessed portions at any depth level of the main groove.

2. The tire according to claim 1, wherein
the groove wall rubber includes a first portion forming the entire first groove wall,
the first portion is exposed on the tread ground contacting surface, and
a width in a tire axial direction of the first portion gradually decreases inwardly in a tire radial direction from the tread ground contacting surface.

3. The tire according to claim 2, wherein
the width in the tire axial direction of the first portion on the tread ground contacting surface is in a range of from 1.3 to 2.0 times a maximum recess amount of the recessed portion from the groove edge.

4. The tire according to claim 2, wherein
a tread reinforcing ply layer is provided inside the tread portion, and
a height in the tire radial direction of the first portion is in a range of from 0.7 to 0.9 times a tread thickness in the tire radial direction between the tread ground contacting surface at a tire equator and an outer surface of the tread reinforcing ply layer.

5. The tire according to claim 1, wherein
the main groove includes a shoulder main groove arranged closest to a tread edge,
the shoulder main groove includes the first groove wall arranged on a side of the tread edge and a second groove wall arranged on a side of the tire equator,
the groove wall rubber includes a first portion forming the entire first groove wall and a second portion forming the entire second groove wall,
each of the first portion and the second portion is exposed on the tread ground contacting surface, and
on the tread ground contacting surface, a width in a tire axial direction from the groove edge of the first groove wall to a boundary between the first portion and the base rubber is larger than a width in a tire axial direction from the groove edge of the second groove wall to a boundary between the second portion and the base rubber.

6. The tire according to claim 1, wherein
the main groove has a second groove wall, and
the second groove wall is provided with the recessed portion.

7. The tire according to claim 1, wherein a groove bottom surface of each of the main grooves is formed of the base rubber.

8. The tire according to claim 1, wherein
in a cross section passing through the most recessed portion and taken in parallel with the ground contacting surface of the tread portion, the first recessed portion has a contour smoothly curved in an arc shape, and
a curvature of the contour gradually and continuously increases radially inwardly.

9. The tire according to claim 1, wherein
each of the second recessed portions has a length in the tire circumferential direction smaller than a length in the tire circumferential direction of each of the first recessed portions,
each of the second recessed portions has a flat surface arranged between the most recessed portion and the groove edge of the main groove, and
a maximum recess amount of each of the second recessed portions is smaller than a maximum recess amount of each of the first recessed portions,
in a radial cross section of each of the second recessed portions passing through the most recessed portion thereof, the each of the second recessed portions has the recess amount gradually and continuously decreasing toward both sides in the tire radial direction from the most recessed portion to the groove edge and to the groove bottom of the main groove, and the recess amount continuously and linearly decreasing between the most recessed portion to the groove edge over an entire length therebetween.

10. The tire according to claim 9, wherein
the main groove has a second groove wall opposing to the first groove wall,
the second groove wall is provided with a plurality of the first recessed portions and a plurality of the second recessed portions, and
the first recessed portions and the second recessed portions of the second groove wall are arranged alternately one by one and continuously to each other in the tire circumferential direction.

11. The tire according to claim 10, wherein
each of the first recessed portions provided in the second groove wall faces a respective one of the second recessed portions provided in the first groove wall, and
each of the second recessed portions provided in the second groove wall faces a respective one of the first recessed portions provided in the first groove wall.

12. The tire according to claim 10, wherein
the main groove includes a shoulder main groove arranged closest to a tread edge and a crown main groove arranged adjacently to the shoulder main groove on a tire equator side, and
in each of the shoulder main groove and the crown main groove, the first recessed portions provided in the first groove wall and the first recessed portions provided in the second groove wall are arranged alternately one by one in the same phase with each other in the tire circumferential direction.

13. The tire according to claim 1, wherein
in a cross-sectional view of the tread portion passing through the most recessed portion of each of the first recessed portions and taken in the tire radial direction,
each of the first recessed portions consists of a concave surface portion and a convex surface portion,
the concave surface portion is connected directly with a groove bottom surface of the main groove,
the convex surface portion is connected directly with the concave surface portion on the radially outer side thereof so as to connect directly the concave surface portion and the tread ground contacting surface,
the concave surface portion is recessed outwardly in the groove width direction and curved in a continuous arc shape over an entire radial length of the concave surface portion,
the convex surface portion is convex toward the side of the groove center line of the main groove and curved in a continuous arc shape over an entire radial length of the convex surface portion, and
the most recessed portion is positioned in the concave surface portion.

14. The tire according to claim 13, wherein the groove edge of the main groove extends linearly and parallel to the tire circumferential direction over an entire length thereof.

15. A tire comprising a tread portion comprising a tread ground contacting surface and at least one main groove recessed from the tread ground contacting surface and extending continuously in a tire circumferential direction, wherein
the main groove has a first groove wall,
the first groove wall is provided with recessed portions arranged continuously in the tire circumferential direction and each recessed outwardly in a groove width direction from a groove edge of the main groove on the tread ground contacting surface so that the entire first groove wall is recessed from the groove edge at any depth level of the main groove,
each of the recessed portions is formed of groove wall rubber having a complex elastic modulus larger than that of base rubber forming a main portion of the tread ground contacting surface,
a groove bottom surface of the main groove and the main portion of the tread ground contacting surface are integrally formed of the base rubber,
each of the recessed portions has a most recessed portion recessed most outwardly in the groove width direction from a groove centerline of the main groove,
the recessed portions include first recessed portions and second recessed portions arranged alternately one by one and continuously to each other in the tire circumferential direction at any depth level of the main groove,
each of the first recessed portions has a recess amount gradually and continuously decreasing toward both sides in the tire circumferential direction from the most recessed portion to both ends of each of the first recessed portions in the tire circumferential direction in a cross-sectional view of the tread portion passing through the most recessed portion and parallel to the tread ground contacting surface,
in a radial cross section of each of the first recessed portions passing through the most recessed portion thereof, each of the first recessed portions has the recess amount gradually and continuously decreasing toward both sides in the tire radial direction from the most recessed portion to the groove edge and to a groove bottom of the main groove, and
each of the second recessed portions has a recess amount constant in the tire circumferential direction over an entire circumferential length of the each of the second recessed portions at any depth level of the main groove.

16. A tire comprising a tread portion comprising a tread ground contacting surface and at least one main groove recessed from the tread ground contacting surface and extending continuously in a tire circumferential direction, wherein
the main groove has a first groove wall,
the first groove wall is provided with recessed portions arranged continuously in the tire circumferential direction and each recessed outwardly in a groove width direction from a groove edge of the main groove on the tread ground contacting surface so that the entire first groove wall is recessed from the groove edge at any depth level of the main groove,
each of the recessed portions is formed of groove wall rubber having a complex elastic modulus larger than that of base rubber forming a main portion of the tread ground contacting surface,
each of the recessed portions has a most recessed portion recessed most outwardly in the groove width direction from a groove centerline of the main groove,
the recessed portions include first recessed portions and second recessed portions arranged alternately one by one and continuously to each other in the tire circumferential direction at any depth level of the main groove, each of the first recessed portions has a recess amount gradually and continuously decreasing toward both sides in the tire circumferential direction from the most recessed portion to both ends of each of the first recessed portions in the tire circumferential direction in a cross-sectional view of the tread portion passing through the most recessed portion and parallel to the tread ground contacting surface, each of the first recessed portions has a continuous arc shape over an entire circumferential length of each of the first recessed portions in a cross-sectional view of the tread portion passing through the most recessed portion and parallel to the tread ground contacting surface.

17. A tire comprising a tread portion comprising a tread ground contacting surface and at least one main groove recessed from the tread ground contacting surface and extending continuously in a tire circumferential direction, wherein the main groove has a first groove wall, the first groove wall is provided with recessed portions arranged continuously in the tire circumferential direction and each recessed outwardly in a groove width direction from a groove edge of the main groove on the tread ground contacting surface so that the entire first groove wall is recessed from the groove edge at any depth level of the main groove, each of the recessed portions is formed of groove wall rubber having a complex elastic modulus larger than that of base rubber forming a main portion of the tread ground contacting surface, and a groove bottom surface of each of the main grooves and the main portion of the tread ground contacting surface are integrally and continuously formed of the same base rubber.

18. A tire comprising a tread portion comprising a tread ground contacting surface and at least one main groove recessed from the tread ground contacting surface and extending continuously in a tire circumferential direction, wherein the main groove has a first groove wall, the first groove wall is provided with recessed portions arranged continuously in the tire circumferential direction and each recessed outwardly in a groove width direction from a groove edge of the main groove on the tread ground contacting surface so that the entire first groove wall is recessed from the groove edge at any depth level of the main groove, each of the recessed portions is formed of groove wall rubber having a complex elastic modulus larger than that of base rubber forming a main portion of the tread ground contacting surface, the recessed portions include first recessed portions each having a most recessed portion recessed most outwardly in the groove width direction and a recess amount gradually and continuously decreasing toward both sides in the tire circumferential direction from the most recessed portion to both ends of each of the first recessed portions in the tire circumferential direction such that each of the first recessed portions has a continuous arc shape over an entire circumferential length of each of the first recessed portions in a cross-sectional view of the tread portion passing through the most recessed portion and parallel to the tread ground contacting surface, and in a cross-sectional view of the tread portion passing through the most recessed portion of each of the first recessed portions and taken in the tire radial direction, the most recessed portion is positioned in a bottom half of the first groove wall.

19. The tire according to claim 1, wherein the most recessed portion of each of the first recessed portions is positioned at a radial position different from the most recessed portion of each of the second recessed portions.

* * * * *